United States Patent
Ioffe et al.

(10) Patent No.: US 12,513,509 B2
(45) Date of Patent: Dec. 30, 2025

(54) SYSTEMS AND METHODS FOR SUPPORTING EVOLVING BAND REGULATIONS

(71) Applicant: Apple Inc., Cupertino, CA (US)

(72) Inventors: Anatoliy S Ioffe, Sunnyvale, CA (US); Daniel Popp, Munich (DE); Sumit Verma, San Diego, CA (US); Abhishek Rala, Campbell, CA (US)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 18/095,376

(22) Filed: Jan. 10, 2023

(65) Prior Publication Data

US 2023/0345229 A1    Oct. 26, 2023

Related U.S. Application Data

(60) Provisional application No. 63/333,404, filed on Apr. 21, 2022.

(51) Int. Cl.
*H04W 48/00* (2009.01)
*H04W 8/22* (2009.01)
*H04W 72/51* (2023.01)

(52) U.S. Cl.
CPC ............. *H04W 8/22* (2013.01); *H04W 72/51* (2023.01)

(58) Field of Classification Search
CPC ....... H04W 8/22; H04W 72/51; H04W 48/12; H04W 52/367; H04W 48/10; H04W 8/24; H04W 8/00–30; H04W 48/00–20; H04L 5/0007; H04L 5/0094; H04L 5/0053–0057
See application file for complete search history.

(56) References Cited

U.S. PATENT DOCUMENTS

| | | | |
|---|---|---|---|
| 12,088,401 B2* | 9/2024 | Ioffe | H04B 7/18519 |
| 2019/0223119 A1* | 7/2019 | Takahashi | H04W 52/367 |
| 2022/0361089 A1* | 11/2022 | Ioffe | H04W 52/0212 |
| 2023/0007570 A1* | 1/2023 | Ioffe | H04W 52/0212 |
| 2023/0422152 A1* | 12/2023 | Ioffe | H04W 48/08 |

OTHER PUBLICATIONS

RP-190166, "New WID on introduction of n30," Ericsson, AT&T, 3GPP RAN #83, Mar. 2019.
R4-1904649, "n30 A-MPR," Qualcomm, 3GPP RAN4 #90bis, Apr. 2019.

(Continued)

*Primary Examiner* — Ronald Eisner
(74) *Attorney, Agent, or Firm* — FLETCHER YODER PC

(57) ABSTRACT

A base station sends system information to user equipment based on the user equipment detecting network coverage provided by the base station. The system information may include one or more network signaling flags indicative of a legacy regulation and an updated regulation (or a legacy version of a regulation and an updated version of the regulation) for operating on a frequency band. The user equipment transmits an indication to the base station as to whether it supports the legacy regulation and/or the updated regulation. The base station configures uplink and/or downlink resources on the frequency band for the user equipment based on the regulation indicated. The user equipment and the base station then communicate using the configured resources on the frequency band.

20 Claims, 6 Drawing Sheets

(56) References Cited

OTHER PUBLICATIONS

R4-2119840, "WF on NS_21 Regulatory Requirements," Qualcomm, Apple, 3GPP RAN4 #101, Nov. 2021.

Moderator (Oppo): "Email discussion summary for [102-3][102] R16_Maintenance", 3GPP draft; R-42206402, 3rd Generation Partnership Project (3GPP), vol. RAN @G4, No. Electronic Meeting; Feb. 21, 2022-Mar. 3, 2022, Mar. 4, 2022, XP052123222, [retrieved from internet: https://ftp.3gpp.org/tsg_ran/WG4_Radio/TSGR4-102-e/Docs/R4-2206402.zip] [ retrieved on Mar. 3, 2022]; 39 pgs.

Qualcomm Incorporated: "Incorporating WRC19 resolutions into FR2 specifications", 3GPP Draft; R4-2006787, 3rd Generation Partnership Project (3GPP), vol. RAN WG4, No. Onlin; May 25, 2020-Jun. 5, 2020, May 15, 2020 (XP051883831) [retrived from internet: http;s://ftp.3gpp.org/tsg_ran/WG4_Radio/TSGR4_95_3/Docs/R4-2006787.zip] [retrieved on May 15, 2020]; 7 pgs.

Apple et al.: "Canada regulation and band n30 requirements", 3GPP Draft; RP-220454, 3rd Generation Partnership Project (3GPP), vol. TSG RAN, No. Online; Mar. 17, 2022-Mar. 23, 2022, Mar. 11, 2022 (XP052127950) [retrieved from internet: https://ftp.3gpp.org/tsg_ran/TSG_RAN/TSGR_95e/Docs/RP-220454.zip RP-220454 canadian n30 NS v3.docs] [retrieved on Mar. 11, 2022]; 8pgs.

Extended European Search Report for European Patent Application No. 23165053.2 dated Sep. 15, 2023; 12 pgs.

Ericsson: "Specification of bits of the field "modified MPR behavior" indicated in UE capability", 3GPP Draft; R4-141866, 3rd Generation Partnership Project (3GPP), vol. RAN WG4, No. San Jose del Cabo, Mexico, Mar. 31, 2014-Apr. 4, 2014, Mar. 31, 2014 (XP050796958), retrieved from the internet [https://www.3gpp.org/ftp/Meetings_3GPP_SYNC/RAN4/Docs/] [retrieved on Mar. 31, 2014].

Extended European Search Report for European Patent Application No. 23200044.8, dated Dec. 21, 2023, 11 pgs.

R4-2112348, "Additional requirements and A-MPR for NS_21 and n30", Apple, 3GPP RAN WG4 Meeting #100-e, Aug. 16-27, 2021.

R4-2115084, "WF on NS_21 SEM and A-MPR", Apple, 3GPP RAN WG4 Meeting #100-e, Aug. 16-27, 2021.

R4-2203676, "draftCR to 38.101-1 on new NS for Canadian WCS regulation R16," Apple, 3GPP RAN4 #102, Feb. 21-Mar. 3, 2022.

R4-2206402, "Email discussion summary for [102-e][102] R16_Maintenance," Moderator (OPPO), 3GPP RAN4 #102, Feb. 21-Mar. 3, 2022.

RP-220455, "CR to 38.101-1 on new NS for Canadian WCS regulation R16," Apple, 3GPP RAN #95, Mar. 17-23, 2022.

RP-220456, "Cr to 38.101-1 on new NS for Canadian WCS regulation R17," Apple, 3GPP RAN #95, Mar. 17-23, 2022.

RP-220465, " Draft LS to ISED-Canada to clarify the RSS-195 requirement related to NR band n30 use," Apple, 3GPP RAN #95, Mar. 17-23, 2022.

\* cited by examiner

| FREQUENCY (MHz) | ATTENUATION (dB) |
|---|---|
| <2200 | $43 + 10\log_{10}(p)$ |
| 2200–2288 | $70 + 10\log_{10}(p)$ |
| 2288–2292 | $67 + 10\log_{10}(p)$ |
| 2292–2296 | $61 + 10\log_{10}(p)$ |
| 2296–2300 | $55 + 10\log_{10}(p)$ |
| 2300–2305 | $43 + 10\log_{10}(p)$ |
| 2305–2320 | $43 + 10\log_{10}(p)$ |
| 2320–2324 | $55 + 10\log_{10}(p)$ |
| 2324–2328 | $61 + 10\log_{10}(p)$ |
| 2328–2337 | $67 + 10\log_{10}(p)$ |
| 2337–2341 | $61 + 10\log_{10}(p)$ |
| 2341–2345 | $55 + 10\log_{10}(p)$ |
| 2345–2360 | $43 + 10\log_{10}(p)$ |
| 2360–2365 | $43 + 10\log_{10}(p)$ |
| 2365–2395 | $70 + 10\log_{10}(p)$ |
| >2395 | $43 + 10\log_{10}(p)$ |

FIG. 6

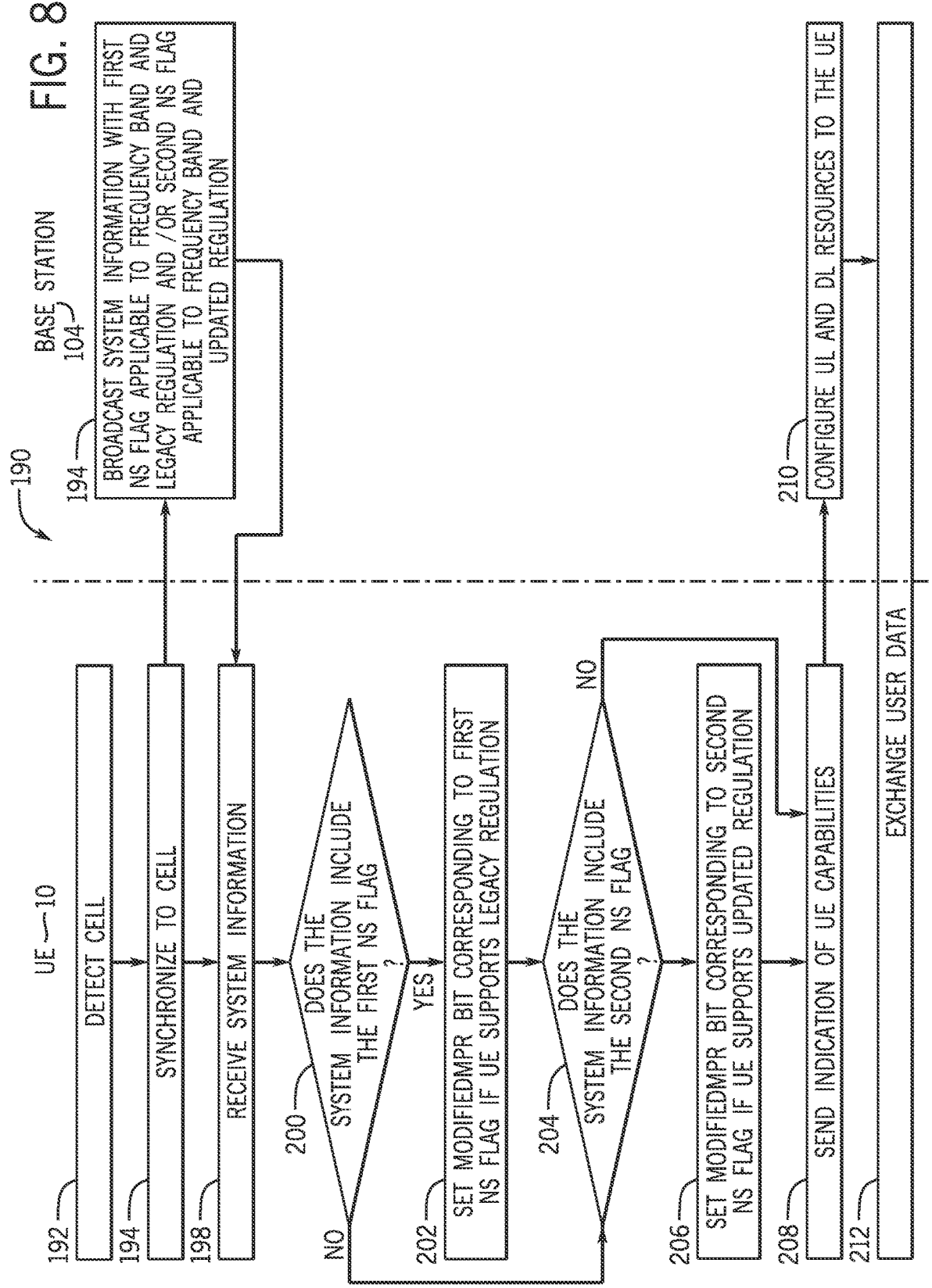

SYSTEMS AND METHODS FOR SUPPORTING EVOLVING BAND REGULATIONS

CROSS-REFERENCE TO RELATED APPLICATIONS

This application claims priority to U.S. Provisional Application No. 63/333,404, filed Apr. 21, 2022, entitled "SYSTEMS AND METHODS FOR SUPPORTING EVOLVING BAND REGULATIONS," the disclosure of which is incorporated by reference herein in its entirety for all purposes.

BACKGROUND

The present disclosure relates generally to wireless communication, and more specifically to evolving and expanded regulations relating to radio frequency bands.

In cellular communication, user equipment (e.g., a cell phone) may communicate with a communication network (e.g., via a base station) under guidelines or rules that may be set and enforced by regulatory and/or standards bodies, such as the Federal Communications Commission (FCC), the Third Generation Partnership Project (3GPP), and so on. However, when the guidelines or rules are updated, user equipment configured to operate in accordance with the guidelines or rules prior to the update may not be able to properly or efficiently operate under the updated guidelines or rules.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, user equipment includes a receiver, a transmitter, and processing circuitry that causes the receiver to receive system information from a base station. The system information includes one or more network signaling flags indicative of a regulation applicable to a frequency range, and the regulation is associated with a legacy regulation and an updated regulation. The processing circuitry also causes the transmitter to transmit an indication that the user equipment supports the legacy regulation based on the user equipment supporting the legacy regulation, and causes the transmitter to transmit an indication that the user equipment supports the updated regulation based on the user equipment supporting the updated regulation.

In another embodiment, a communication hub includes a transmitter, a receiver, and processing circuitry that causes the transmitter to broadcast system information having a first indication of a frequency band and a regional regulation corresponding to the frequency band. The processing circuitry also causes the receiver to receive, from user equipment, a second indication of a legacy regulation associated with the regional regulation or an updated regulation corresponding to the regional regulation. The processing circuitry further configures uplink resources or downlink resources for the user equipment based on the second indication.

In yet another embodiment, a method performed by user equipment includes receiving, via a receiver of the user equipment, system information from a base station. The system information includes a first network signaling flag indicative of a legacy regulation applicable to a frequency range or a second network signaling flag indicative of an updated regulation applicable to the frequency range. The method also includes configuring, via processing circuitry of the user equipment, a first field corresponding to the first network signaling flag based on the user equipment supporting the legacy regulation. The method further includes configuring, via the processing circuitry, a second field corresponding to the second network signaling flag based on the user equipment supporting the updated regulation. The method also includes transmitting, via a transmitter of the user equipment, an indication of capabilities of the user equipment to the base station comprising the first field and the second field.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 6 is a table that defines emission threshold or attenuation associated with the network signaling 21 mask and RSS-195 for different frequencies for which a channel is allocated;

FIG. 8 is a flowchart of a method for determining whether user equipment may operate without restriction on a restricted frequency band, according to embodiments of the present disclosure.

DETAILED DESCRIPTION OF SPECIFIC EMBODIMENTS

Figure 1:
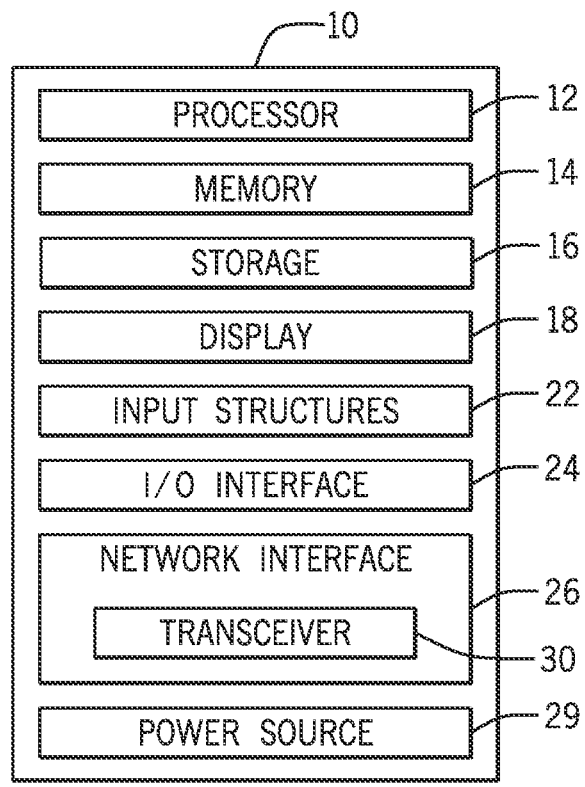
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

In wireless (e.g., cellular) communication, user equipment (e.g., a cell phone, a smartphone, a tablet, a wearable device, a laptop, and so on) may communicate on a channel of a frequency band with a network (e.g., a wireless communication network) through one or more communication nodes (e.g., base stations). In particular, according to the current Third Generation Partnership Project (3GPP) standard, when establishing communication with the network via base station, the user equipment may detect network coverage (e.g., a cell supported by the base station) and receive system information including a frequency of a channel from the base station. If the user equipment supports the frequency, then the user equipment indicates as such to the base station, and the network may allocate the channel to the user equipment. The user equipment may then communicate with the network over the channel, provided that regulations associated with the frequency band are followed.

However, if the regulations associated with the frequency band are updated (e.g., to implement a different emission mask or requirement(s)), and the user equipment is not updated in kind, then communication with the user equipment on the updated frequency band may become less efficient or fail altogether. For example, a frequency range of 2305-2320 megahertz (MHz) for uplink transmissions and 2345-2360 MHz for downlink receptions is allocated by the Federal Communications Commission (FCC) in the U.S. and the Innovation Science, and Economic Development (ISED) in Canada for licensed operation as Long-Term Evolution (LTE) band 30 and/or New Radio (NR) frequency band n30 in both countries. The 3GPP implemented additional emission requirements based on 47 Code of Federal Regulations (CFR) § 27.53 with a network signaling (NS) 21 emission mask per the FCC in both the LTE and NR specifications. However, the 3GPP Technical Specification Group Radio Access Network Work Group 4 (RAN4) compared the emission requirements as defined by the NS 21 mask and the emission requirements set forth by the ISED under Radio Standard Specification (RSS)-195, and determined that, in the 1 MHz bandwidth adjacent to an allocated channel, an emission limit is more stringent under the RSS-195 than it is as defined by the NS 21 mask. As 47 CFR § 27.53 mandates the same, more stringent emission limit as set forth by RSS-195, it appears that the 3GPP may not be correctly implementing the FCC rule using the NS 21 mask.

However, simply forcing user equipment to comply with the updated regulations (e.g., the more stringent emission limit) may not be practical, as there are hundreds of millions of user equipment operating in the U.S., and possibly billions of user equipment operating across the world, which may not be configured to meet the updated regulations. These user equipment may be referred to as "legacy" user equipment, as they have been manufactured prior to the updated regulations, and so may be configured to prior regulations. For example, the legacy user equipment may include a transmitter having one or more filters that implement the NS 21 mask. These filters may not be configurable at runtime, and, as such, may not be updated to implement the more stringent emission limits under the RSS-195. As such, it may be desired to implement a scheme that enables new user equipment (e.g., user equipment manufactured after the updated regulations are effective) to comply with the updated regulation without decertifying the legacy user equipment that are already in operation.

The presently disclosed embodiments enable phasing in regional regulatory changes associated with a frequency band, and user equipment to indicate regulations with which the user equipment is compliant. In particular, a base station of a communication network, such as a cellular network (e.g., a LTE and/or NR network), may send system information to the user equipment based on the user equipment detecting network coverage provided by the base station. The system information may include one or more network signaling flags or bits indicative of regulations supported by the base station. The regulations may include a legacy or older regulation and an updated regulation (or a legacy or older version of a regulation and an updated version of the regulation) for operating on the frequency band. For example, the regulations may include 47 CFR § 27.53 as implemented using the NS 21 emission mask, and the more stringent RSS-195 emission limits, for operating on the LTE frequency band 30 and/or the NR frequency band n30. In some embodiments, a presence of network signaling flag (e.g., setting the flag to a high value or 1) may indicate that the updated regulation is supported by the base station, while an absence of the network signaling flag (e.g., setting the flag to a low value or 0) may indicate that the legacy regulation is supported by the base station. In additional or alternative embodiments, a first network signaling flag may indicate that the legacy regulation is supported by the base station, and a second network signaling flag may indicate that the updated regulation is supported by the base station.

In response to receiving the one or more network signaling flags, the user equipment may transmit an indication to the base station corresponding to the one or more network signaling flags as to whether it supports the legacy regulation and/or the updated regulation. In some embodiments, the indication may include a modified maximum power reduction (MPR) bit (e.g., a bit in the modified MPR-Behavior field according to the 3GPP for the NR specification) corresponding to the one or more network signaling flags, and the user equipment may set the modified MPR bit to a predetermined value (e.g., to a high value or 1) to indicate that it supports the updated regulation, and may not set the modified MPR bit to the predetermined value to indicate that it supports the legacy regulation and not the updated regulation. The user equipment may then send the indication to the base station, which may configure uplink and/or downlink resources on the frequency band (e.g., the LTE band 30 and/or the NR band n30) for the user equipment based on the regulation indicated. The user equipment and the base station may then communicate using the configured resources on the frequency band. While this disclosure refers to the LTE band 30 and/or the NR band n30, 47 CFR § 27.53, and RSS-195, it should be understood that the disclosed embodiments may apply to any suitable frequency band where regulations are updated.

FIG. 1 is a block diagram of user equipment 10, according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. For example, the network interface 26 may include, for example, one or more interfaces for using a cellular communication standard of the 5G specifications that include the millimeter wave (mm-Wave) frequency range (e.g., 24.25-300 gigahertz (GHz)) that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
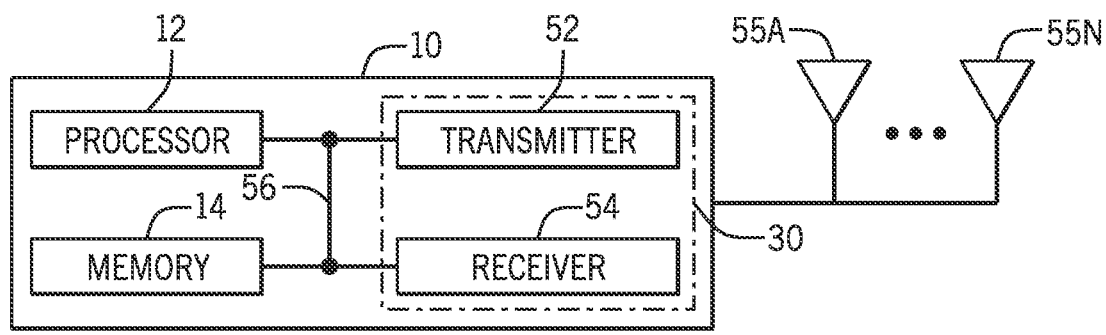
FIG. 2 is a functional block diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
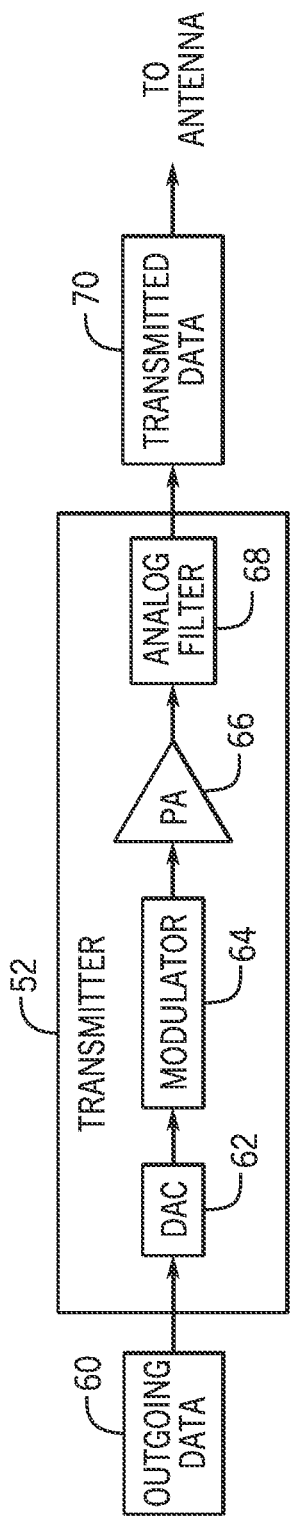
FIG. 3 is a schematic diagram of a transmitter of the user equipment of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. In particular, the filter 68 may implement an emission mask that ensures out-of-channel emissions remain under transmission power limits to prevent interference with out-of-channel communications. The filter 68 may be configured to implement the emission mask, for example, at a time of manufacturing the user equipment 10, and, as such, may not be configurable at runtime (e.g., after purchase by a consumer) of the user equipment 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
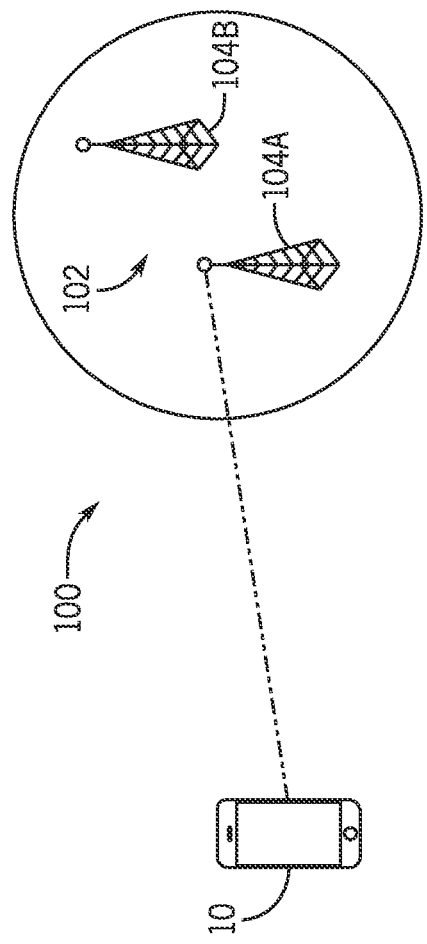
FIG. 4 is a schematic diagram of a communication system including the user equipment of FIG. 1 communicatively coupled to a wireless communication network supported by base stations, according to embodiments of the present disclosure.

FIG. 4 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10, or Evolved NodeB (eNodeB) base stations and may provide 4G/LTE coverage via the wireless communication network 102 to the user equipment 10. The base stations 104 may include any suitable electronic device, such as a communication hub, communication node, access point, and so on, that facilitates, supports, and/or implements the network 102. Each of the base stations 104 may include at least some of the components of the user equipment 10 shown in FIGS. 1 and 2, including one or more processors 12, the memory 14, the storage 16, the transceiver 30, the transmitter 52 (having the associated circuitry shown in FIG. 3), and/or the receiver 54. It should be understood that the network 102 may include any suitable number of base stations 104 (e.g., one or more base stations 104, four or more base stations 104, ten or more base stations 104, and so on).

As previously noted, regulations associated with a frequency band may be updated (e.g., to implement a different emission mask or requirement(s)), and, if the user equipment 10 is not updated in kind, then communication with the user equipment 10 on the updated frequency band may become less efficient or fail altogether. For example, a frequency range of 2305-2320 megahertz (MHz) for uplink transmissions and 2345-2360 MHz for downlink receptions is allocated by the FCC in the U.S. and the ISED in Canada for licensed operation as LTE band 30 and/or NR band n30 in both countries. The 3GPP implemented additional emission requirements based on 47 CFR § 27.53 with an NS 21 emission mask per the FCC in both the LTE and NR specifications.

Figure 5:
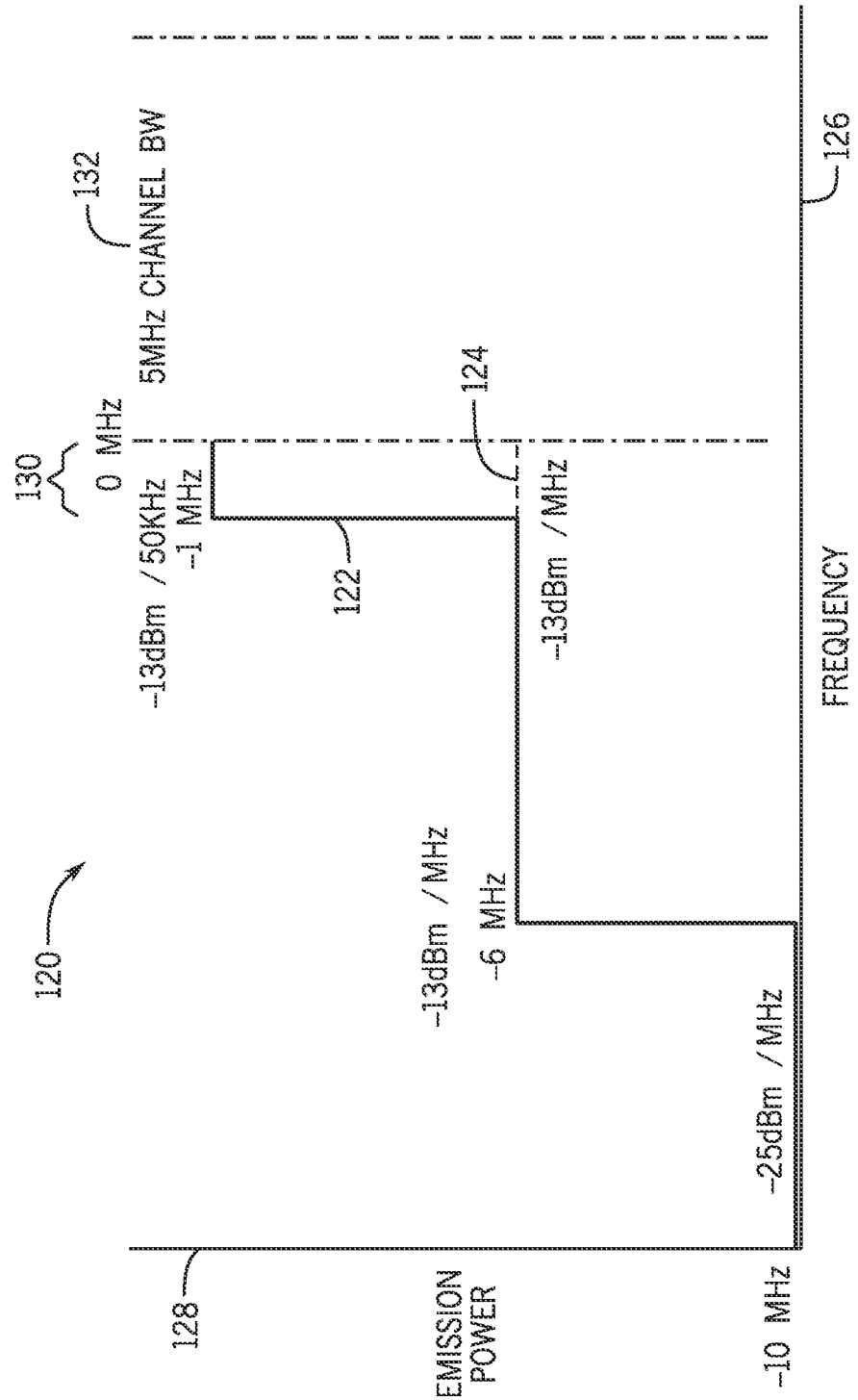
FIG. 5 is a frequency diagram illustrating emission requirements as defined by a network signaling 21 mask as implemented by the Federal Communications Commission (FCC) in the U.S. and emission requirements set forth by the Innovation Science, and Economic Development (ISED) in Canada under Radio Standard Specification (RSS)-195.

FIG. 5 is a frequency diagram 120 illustrating the emission requirements as defined by the NS 21 mask 122 and the emission requirements set forth by the ISED under RSS-195 124. As illustrated, a horizontal or x-axis 126 represents frequency (e.g., in megahertz (MHz)) and a vertical or y-axis 128 represents emission power (e.g., in decibel milliwatts (dBm)). The 3GPP RAN4 compared the emission requirements as defined by the NS 21 mask 122 and the emission requirements set forth by the ISED under RSS-195 124, and determined that, in a 1 MHz bandwidth 130 adjacent to an allocated channel 132, an emission limit is more stringent under RSS-195 124 than it is as defined by the NS 21 mask 122. In particular, the NS 21 mask 122 allows emissions (e.g., shown to have a transmission power of −13 dBm) to be integrated over 1% of a signal bandwidth (e.g., 50 kilohertz (kHz)) as opposed to 1 MHz according to RSS-195 124, over the 1 MHz bandwidth 130 adjacent to the allocated channel 132. That is, in the 1 MHz bandwidth 130 adjacent to the allocated channel 132, the emission limit enforced by RSS-195 124 is more stringent (e.g., enables a lower emission or transmission power) than the NS 21 mask 122. It should be understood that the NS 21 mask 122 and the emission requirements set forth by the ISED under RSS-195 124 also apply to the 1 MHz bandwidth greater than and adjacent to the allocated channel 132 in frequency, and not just the 1 MHz bandwidth 130 less than and adjacent to the allocated channel 132 as shown in FIG. 5.

It should be understood that the threshold of −13 dBm as shown in FIG. 5 is used purely as an example, and both 47 CFR § 27.53 and RSS-195 use the table shown in FIG. 6 to define the emission threshold or attenuation in decibels (dB) that may be integrated over the 1 MHz bandwidth 130 on either side (e.g., in terms of frequency) and adjacent to the allocated channel 132 per RSS-195 124, or 1% of a signal bandwidth (e.g., 50 kilohertz (kHz)) per the NS 21 mask 122, where the variable p in the table is power in Watts, for different frequencies (in MHz) for which the channel 132 is allocated.

Because 47 CFR § 27.53 mandates the same, more stringent emission limit as set forth by RSS-195 124, it appears that the 3GPP may not be correctly implementing the FCC rule using the NS 21 mask 122. It is possible, even likely, that, in terms of regulatory decisions related to use of the LTE band 30 and/or NR band n30 in the U.S. and Canada, the ISED may confirm the RSS-195 regulation as valid without any changes. The FCC may additionally confirm 47 CFR § 27.53 as valid without any changes. Given the incorrect interpretation of 47 CFR § 27.53 with the NS 21 mask, and the existence of legacy user equipment that comply with and/or are configured to implement the NS 21 mask, but not necessarily with 47 CFR § 27.53, the FCC may allow for the correct interpretation of 47 CFR § 27.53 to be phased in over a period of time. For example, legacy user equipment (e.g., those that have been manufactured prior to the updated regulations becoming effective) may remain certified for operation on the LTE band 30 and/or NR band n30 in the U.S. and Canada and continue to operate based on the existing NS 21 emission requirements. New user equipment (e.g., user equipment manufactured after the updated regulations are effective or after the phase-in period) shall comply with the correct interpretation of 47 CFR § 27.53 (e.g., corresponding to the RSS-195 regulation).

The presently disclosed embodiments enable phasing in regional regulatory changes associated with a frequency band, and the user equipment 10 to indicate regulations with which the user equipment 10 is compliant. In particular, the base station 104 may send system information to the user equipment 10 based on the user equipment 10 detecting network coverage provided by the base station 104. The system information may include one or more network signaling flags indicative of regulations supported by the base station 104. The regulations may include a legacy regulation and an updated regulation (or a legacy version of a regulation and an updated version of the regulation) for operating on the frequency band. For example, the regulations may include 47 CFR § 27.53 as implemented using the NS 21 emission mask (e.g., the legacy regulation), and the more stringent RSS-195 emission limits (e.g., the updated regulation), for operating on the LTE frequency band 30 and/or the NR frequency band n30. In some embodiments, a presence of network signaling flag (e.g., setting the flag to a high value or 1) may indicate that the updated regulation is supported by the base station 104, while an absence of the network signaling flag (e.g., setting the flag to a low value or 0) may indicate that the legacy regulation is supported by the base station 104. In additional or alternative embodiments, a first network signaling flag may indicate that the legacy regulation is supported by the base station 104, and a second network signaling flag may indicate that the updated regulation is supported by the base station 104.

In response to receiving the one or more network signaling flags, the user equipment 10 may transmit an indication to the base station 104 corresponding to the one or more network signaling flags as to whether it supports the legacy regulation and/or the updated regulation. In some embodiments, the indication may include a modified maximum power reduction (MPR) bit corresponding to the one or more network signaling flags, and the user equipment 10 may set the modified MPR bit to a predetermined value (e.g., to a high value or 1) to indicate that it supports the updated regulation, and may not set the modified MPR bit to the predetermined value to indicate that it supports the legacy regulation and not the updated regulation. The user equipment 10 may then send the indication to the base station 104, which may configure uplink and/or downlink resources on the frequency band (e.g., the LTE band 30 and/or the NR band n30) for the user equipment 10 based on the regulation indicated. The user equipment 10 and the base station 104 may then communicate (e.g., send and receive user data) using the configured resources on the frequency band.

Figure 7:
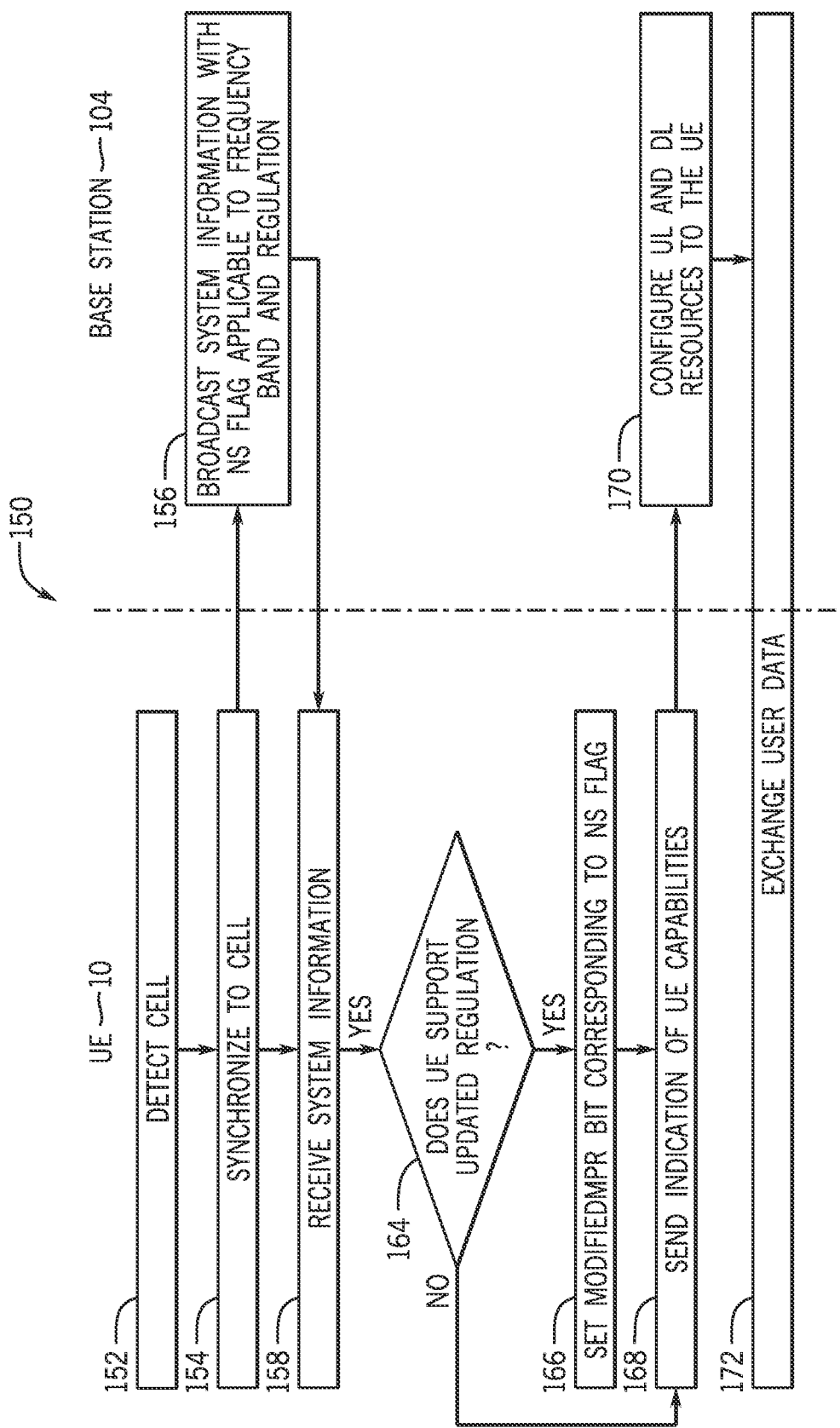
FIG. 7 is a flowchart of a method for configuring the transceiver of the user equipment to communicate with the wireless communication network of FIG. 4 using one or more frequency subranges, according to embodiments of the present disclosure.

FIG. 7 is a flowchart of a method 150 for establishing communication between the user equipment 10 and the base station 104 while phasing in an updated regulation using a network signaling flag, according to embodiments of the present disclosure. Any suitable device (e.g., a controller) that may control components of the user equipment 10, the base station 104, and/or the network 102, such as the processor 12 of each of these devices or systems, may perform the method 150. In some embodiments, the method 150 may be implemented by executing instructions stored in a tangible, non-transitory, computer-readable medium, such as the memory 14 or storage 16, using the processor 12. For example, the method 150 may be performed at least in part by one or more software components, such as an operating systems, one or more software applications, and the like, of the user equipment 10, the base station 104, and/or the network 102. While the method 150 is described using steps in a specific sequence, it should be understood that the present disclosure contemplates that the described steps may be performed in different sequences than the sequence illustrated, and certain described steps may be skipped or not performed altogether.

At block 152, the user equipment 10 detects the base station 104 (e.g., a cell of the base station 104). In particular, the user equipment 10 may detect the base station 104 by receiving a radio frequency (RF) signal when the user equipment 10 enters a coverage area of the base station 104 (e.g., a geographical region for which the base station 104 provides network coverage). The RF signal may include timing alignment information, among other information. At block 154, the user equipment 10 synchronizes to the base station 104 (e.g., the cell of base station 104) by aligning its timing with the timing alignment information of the base station 104.

At block 156, the base station 104 broadcasts system information indicative of frequency bands and regional regulations supported by the base station 104. In particular, the base station 104 may indicate the regulations in one or more network signaling (NS) flags that are applicable or correspond to one or more frequency bands. That is, the 3GPP may define one or more network signal flags that correspond to one or more regulations for operation on the one or more frequency bands. For example, the base station 104 may transmit an indication of the LTE frequency band 30 and/or the NR frequency band n30, and a network signaling flag that indicates the regulation on that frequency band (e.g., whether it be the legacy NS 21 emission mask implemented by the FCC or the more stringent RSS-195 emission requirement implemented by the ISED). That is, the base station 104 may set the network signaling flag to indicate the regulation (whether it be the legacy or the updated version), which may have an identifier to distinguish itself from other network signaling flags, corresponding to the regulation to a predetermined value (e.g., to a high value or 1). As with legacy and newer user equipment, there may also be legacy base stations 104 that have not yet been upgraded to implement the updated regulation, and so implement the legacy regulation, as well as newer base stations 104 that have been upgraded to and may operate according to the updated regulation.

At block 158, the user equipment 10 reads the system information, including the indication of the frequency band and the network signaling flag, received from the base station 104. The system information may additionally include timing specification, power specifications, Global Positioning System (GPS) or Global Navigation Satellite System (GNSS) coordinates, and/or any other suitable information to enable the user equipment 10 to establish communication with the base station 104. In some embodiments, the user equipment 10 may store the system information in the memory 14 for future usage.

At block 164, the user equipment 10 determines whether it supports the updated regulation (e.g., or updated version of the regulation). For example, if the network signaling flag indicates an emission limit or requirement for the LTE frequency band 30 and/or the NR frequency band n30, then the user equipment 10 may determine whether it supports the more stringent RSS-195 emission requirement implemented by the ISED. If the user equipment 10 determines that it supports the updated regulation, then the user equipment 10, at block 166, indicates that it supports the updated regulation. In particular, the user equipment 10 may set a modified maximum power reduction (MPR) bit (e.g., a bit in the modified MPR-Behavior field) as provided by the 3GPP for the NR specification.

At block 168, the user equipment 10 transmits an indication of its capabilities to the base station 104 (e.g., as associated with the system information sent by the base station 104). In the case that the user equipment 10 supports the updated regulation (from block 164), the user equipment 10 may transmit an indication that it supports the updated regulation (e.g., as applied to the LTE frequency band 30 and/or the NR frequency band n30) indicated in the system information sent by the base station 104, which may include the modified MPR bit that indicates that the user equipment 10 specifically supports the updated regulation (e.g., the more stringent RSS-195 emission requirement implemented by the ISED).

In the case that the user equipment 10 does not support the updated regulation (from block 164), the user equipment 10 may transmit an indication that it supports the legacy regulation indicated in the system information sent by the base station 104 by not setting or including the modified MPR bit (e.g., not setting the modified MPR bit to the predetermined value) that indicates that the user equipment 10 supports the updated regulation. For example, the user equipment 10 may not set the modified MPR bit, or set the modified MPR bit to a value other than the predetermined value (e.g., a low value or 0), to indicate that it supports the legacy regulation (e.g., the NS 21 emission mask implemented by the FCC), but not the updated regulation.

At block 170, the base station 104 configures the user equipment 10 based on the indication sent in block 168. That is, if the indication indicates that the user equipment 10 supports the updated regulation (as reflected by the modified MPR bit set in block 166 and as sent in block 168), then the base station 104 may configure, for example, uplink and/or downlink resources to the user equipment 10 that conform to the updated regulation. For example, the base station 104 may configure uplink operating characteristics of the transmitter 52 of the user equipment 10 such that emissions outside an allocated channel conform to the RSS-195 emission requirement implemented by the ISED. That is, the base station 104 may configure uplink operating characteristics of the transmitter 52 of the user equipment 10 such that the emissions outside an allocated channel do not exceed an threshold (e.g., −13 dBm as shown in FIG. 5, or any of the emission thresholds or attenuations shown in FIG. 6 depending on the frequency range of the allocated channel 132) when integrated over a 1 MHz bandwidth (e.g., 130) adjacent to and on either side (e.g., in terms of frequency) of the allocated channel 132.

If the indication indicates that the user equipment 10 supports the legacy regulation (as sent in block 168 and without the modified MPR bit being set), then the base station 104 may configure, for example, uplink and/or downlink resources to the user equipment 10 that conform to the legacy regulation. For example, the base station 104 may configure uplink operating characteristics of the transmitter 52 of the user equipment 10 such that emissions outside an allocated channel conform to the NS 21 emission mask implemented by the FCC. That is, the base station 104 may configure uplink operating characteristics of the transmitter 52 of the user equipment 10 such that the emissions outside an allocated channel do not exceed an threshold (e.g., −13 dBm as shown in FIG. 5, or any of the emission thresholds or attenuations shown in FIG. 6 depending on the frequency range of the allocated channel 132) when integrated over 1% of a signal bandwidth (e.g., 50 kHz) adjacent to and on either side (e.g., in terms of frequency) of the allocated channel 132.

At block 172, the base station 104 and the user equipment 10 exchange user data. The user data may include any data, such as payload data, that the user equipment 10 transmits intended for a desired destination device, and/or receives from an intended sending device. In this manner, the method 150 enables establishing communication between the user equipment 10 and the base station 104 while phasing in an updated regulation (e.g., the RSS-195 emission requirement implemented by the ISED) on a frequency range (e.g., the LTE frequency band 30 and/or the NR frequency band n30) using a network signaling flag, and still enabling legacy user equipment 10 to operate using a legacy regulation (e.g., the NS 21 emission mask implemented by the FCC) on the frequency range.

In some embodiments, a first network signaling flag may indicate the legacy regulation, and a second network signaling flag may indicate the updated regulation. FIG. 8 is a flowchart of a method 190 for establishing communication between the user equipment 10 and the base station 104 while phasing in an updated regulation using a network signaling flag, according to embodiments of the present disclosure. Any suitable device (e.g., a controller) that may control components of the user equipment 10, the base station 104, and/or the network 102, such as the processor 12 of each of these devices or systems, may perform the method 190. In some embodiments, the method 190 may be implemented by executing instructions stored in a tangible, non-transitory, computer-readable medium, such as the memory 14 or storage 16, using the processor 12. For example, the method 190 may be performed at least in part by one or more software components, such as an operating systems, one or more software applications, and the like, of the user equipment 10, the base station 104, and/or the network 102. While the method 190 is described using steps in a specific sequence, it should be understood that the present disclosure contemplates that the described steps may be performed in different sequences than the sequence illustrated, and certain described steps may be skipped or not performed altogether.

At block 192, the user equipment 10 detects the base station 104 (e.g., a cell of the base station 104), similar to block 152 described with respect to FIG. 7 above. At block 194, the user equipment 10 synchronizes to the base station 104 (e.g., the cell of base station 104) by aligning its timing with the timing alignment information of the base station 104, similar to block 154 described with respect to FIG. 7 above.

At block 196, the base station 104 broadcasts system information indicative of frequency bands and regional regulations supported by the base station 104. In particular, the base station 104 may indicate a first (e.g., legacy) regulation in a first network signaling flag, and a second (e.g., updated) regulation in a second network signaling flag, which are applicable or correspond to one or more frequency bands. That is, the 3GPP may define the network signal flags that correspond to the regulations for operation on the one or more frequency bands. For example, the base station 104 may transmit an indication of the LTE frequency band 30 and/or the NR frequency band n30, a first network signaling flag that indicates the legacy regulation on that frequency band (e.g., the legacy NS 21 emission mask implemented by the FCC), and/or a second network signaling flag that indicates the updated regulation on that frequency band (e.g., the more stringent RSS-195 emission requirement implemented by the ISED). That is, the base station 104 may set each network signaling flag to indicate the respective regulation or version of the regulation, each of which may have an identifier to distinguish itself from other network signaling flags, to a predetermined value (e.g., to a high value or 1).

At block 198, the user equipment 10 reads the system information, including the indication of the frequency band, the first the network signaling flag, and/or the second network signaling flag, received from the base station 104. The system information may additionally include timing specification, power specifications, Global Positioning System (GPS) or Global Navigation Satellite System (GNSS) coordinates, and/or any other suitable information to enable the user equipment 10 to establish communication with the base station 104. In some embodiments, the user equipment 10 may store the system information in the memory 14 for future usage.

At block 200, the user equipment 10 determines whether the system information includes the first network signaling flag associated with the legacy regulation. If so, then at block 202, the user equipment 10 indicates that it supports the legacy regulation. In particular, the user equipment 10 may set a modified MPR bit corresponding to the first network signaling flag as provided by the 3GPP for the NR specification. For example, if the first network signaling flag indicates the legacy NS 21 emission mask implemented by the FCC, then the user equipment 10 may determine whether it supports this regulation. If so, it sets a modified MPR bit corresponding to the first network signaling flag.

Then, or if the user equipment 10 determines that the system information does not include the first network signaling flag associated with the legacy regulation from block 200, at block 204, the user equipment 10 determines whether the system information includes the second network signaling flag associated with the updated regulation. If so, then at block 206, the user equipment 10 indicates that it supports the updated regulation. In particular, the user equipment 10 may set a modified MPR bit corresponding to the second network signaling flag as provided by the 3GPP for the NR specification. For example, if the second network signaling flag indicates the more stringent RSS-195 emission requirement implemented by the ISED, then the user equipment 10 may determine whether it supports this regulation. If so, it sets a modified MPR bit corresponding to the second network signaling flag.

Then, or if the user equipment 10 determines that the system information does not include the second network signaling flag associated with the updated regulation from block 204, at block 208, the user equipment 10 transmits an indication of its capabilities (e.g., as associated with the system information sent by the base station 104). In the case that the user equipment 10 supports the legacy regulation (from block 202), the user equipment 10 may transmit an indication that it supports the legacy regulation (e.g., as applied to the LTE frequency band 30 and/or the NR frequency band n30) indicated in the system information sent by the base station 104, which may include the modified MPR bit corresponding to the first network signaling flag that indicates that the user equipment 10 specifically supports the legacy regulation (e.g., the legacy NS 21 emission mask implemented by the FCC). In the case that the user equipment 10 supports the updated regulation (from block 206), the user equipment 10 may transmit an indication that it supports the updated regulation indicated in the system information sent by the base station 104, which may include the modified MPR bit corresponding to the second network signaling flag that indicates that the user equipment 10 specifically supports the updated regulation (e.g., the more stringent RSS-195 emission requirement implemented by the ISED).

At block 210, the base station 104 configures the user equipment 10 based on the indication sent in block 208. That is, if the indication indicates that the user equipment 10 supports the legacy regulation (as reflected by setting the modified MPR bit corresponding to the first network signaling flag in block 202 and sent in block 208), then the base station 104 may configure, for example, uplink and/or downlink resources to the user equipment 10 that conforms to the legacy regulation. For example, the base station 104 may configure uplink operating characteristics of the transmitter 52 of the user equipment 10 such that emissions outside an allocated channel conform to the NS 21 emission mask implemented by the FCC. That is, the base station 104 may configure uplink operating characteristics of the transmitter 52 of the user equipment 10 such that the emissions outside an allocated channel do not exceed an threshold (e.g., −13 dBm as shown in FIG. 5, or any of the emission thresholds or attenuations shown in FIG. 6 depending on the frequency range of the allocated channel 132) when integrated over 1% of a signal bandwidth (e.g., 50 kHz) adjacent to and on either side (e.g., in terms of frequency) of the allocated channel 132.

If the indication indicates that the user equipment 10 supports the updated regulation (as reflected by setting the modified MPR bit corresponding to second first network signaling flag in block 206 and sent in block 208), then the base station 104 may configure, for example, uplink and/or downlink resources to the user equipment 10 that conforms to the updated regulation. For example, the base station 104 may configure uplink operating characteristics of the transmitter 52 of the user equipment 10 such that emissions outside an allocated channel conform to the RSS-195 emission requirement implemented by the ISED. That is, the base station 104 may configure uplink operating characteristics of the transmitter 52 of the user equipment 10 such that the emissions outside an allocated channel do not exceed an threshold (e.g., −13 dBm as shown in FIG. 5, or any of the emission thresholds or attenuations shown in FIG. 6 depending on the frequency range of the allocated channel 132) when integrated over 1 MHz, over a 1 MHz bandwidth (e.g., 130) adjacent to and on either side (e.g., in terms of frequency) of the allocated channel 132.

At block 212, the base station 104 and the user equipment 10 exchange user data. The user data may include any data, such as payload data, that the user equipment 10 transmits intended for a desired destination device, and/or receives from an intended sending device. In this manner, the method 190 enables establishing communication between the user equipment 10 and the base station 104 while phasing in an updated regulation (e.g., the RSS-195 emission requirement implemented by the ISED) on a frequency range (e.g., the LTE frequency band 30 and/or the NR frequency band n30) using a first network signaling flag corresponding to the legacy regulation (e.g., the NS 21 emission mask implemented by the FCC) and a second network signaling flag corresponding to the updated regulation, and still enabling legacy user equipment 10 to operate using the legacy regulation on the frequency range.

While the disclosed embodiments use modified MPR bits to enable the user equipment 10 to indicate to the base station 104 its supported regulations, it should be understood that any suitable signaling to indicate supported regulations is contemplated. For example, the 3GPP may adopt or specify a new user equipment capability for indicating a user equipment's supported regulations or versions of regulations for an indicated frequency band. Accordingly, block 166 of FIG. 7 and blocks 202 and 206 of FIG. 8 may include the user equipment 10 indicating its supported regulations via this other type of signaling, instead of or in addition to using the modified MPR bits as described above.

As noted above, if the user equipment 10 indicates that it does not support the updated regulation, in block 170 of FIG. 7 and block 210 of FIG. 8, the base station 104 may configure uplink and downlink resources to the user equipment 10 based on the legacy regulation. However, if the FCC required that all user equipment 10 conform to the updated regulation once it becomes effective (e.g., such that there is no phasing in period), then the base station 104 may not configure the uplink and downlink resources to the user equipment 10 based on the legacy regulation. Instead, the base station 104 may perform alternative actions to ensure that the user equipment 10 does not violate the updated regulation (e.g., does not exceed the emission limits of the RSS-195). For example, the base station 104 may reconfigure uplink and downlink resources to the user equipment 10 for a different frequency band (e.g., for which the regulation does not apply, such as a frequency band other than the LTE band 30 and/or the NR band n30). As another example, the base station 104 may indicate a transmission power threshold or limit for which the transmitter 52 of the user equipment may not exceed (e.g., such that emissions from the transmitter 52 may not exceed the emission limits of the RSS-195). As yet another example, the base station 104 may only allocate channels (e.g., either inside or outside the indicated frequency band, such as the LTE band 30 and/or the NR band n30) that do not violate the updated regulation. In particular, the base station 104 may select the channels such that intermodulations generated by signals transmitted on the channels do not interfere with a protected frequency range (e.g., those that may include other communications).

In some embodiments, the frequency band for which there is an updated regulation may also be aggregated with a different frequency band in a dual connectivity configuration. For example, the user equipment 10 may be concurrently or simultaneously communicatively coupled to two types of communication networks (e.g., operating under two types of specifications). In the case where the user equipment 10 may be coupled to both an LTE network (e.g., via an LTE base station 104) and an NR network (e.g., via an NR base station 104), this configuration may be referred to as Evolved-Universal Terrestrial Radio Access-New Radio Dual Connectivity (EN-DC). In the EN-DC configuration, the NR and LTE cells or base stations 104 may exchange some, but limited, information relating to the user equipment's 10 capabilities.

In particular, in cases when performing a handover (e.g., in which a connected cellular call or data session is transferred from one cell or base station 104 to another without disconnecting the call or session), secondary cell activation, and so on, the LTE cell or base station 104 may not have full knowledge of the user equipment's 10 capabilities, and particularly may not receive an indication of whether the user equipment 10 supports the legacy regulation, the updated regulation, or neither regulation (or version of the regulation). As an illustrative example, assuming an EN-DC configuration between an LTE frequency band and an NR frequency band, where the NR band is the band for which the legacy/updated regulation is applicable (e.g., the NR band n30), in a handover operation from a first (e.g., source) eNodeB base station 104 to a second (e.g., destination) eNodeB base station 104, the first eNodeB base station 104 may not have a capability (e.g., a designated field per the LTE specification) to indicate to the second eNodeB base station 104 whether the user equipment 10 supports the legacy regulation, the updated regulation, or neither regulation. Accordingly, during the handover operation, as well as other similar operations where there is a lack of capability of whether the user equipment 10 supports a regional regulation or version of the regulation (e.g., secondary cell activation), the second eNodeB base station 104 may not be aware of whether the user equipment 10 supports the legacy regulation, the updated regulation, or neither regulation.

Thus, in some embodiments, the 3GPP may define a new LTE capability indicating whether the user equipment 10 supports the legacy regulation, the updated regulation, or neither regulation for the NR frequency band (e.g., n30), which may be passed along from eNodeB base station to eNodeB base station.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. User equipment, comprising:
a receiver;
a transmitter; and
processing circuitry configured to
cause the receiver to receive system information from a base station, the system information comprising one or more network signaling flags indicative of a regulation applicable to a frequency range, the regulation associated with a legacy regulation and an updated regulation,
cause the transmitter to transmit an indication that the user equipment supports the legacy regulation based on the user equipment supporting the legacy regulation, and
cause the transmitter to transmit an indication that the user equipment supports the updated regulation based on the user equipment supporting the updated regulation.

2. The user equipment of claim 1, wherein the processing circuitry is configured to cause the transmitter to transmit the indication that the user equipment supports the updated regulation by setting a field corresponding to one or more network signaling flags to a predetermined value.

3. The user equipment of claim 2, wherein the field comprises a modified maximum power reduction behavior field.

4. The user equipment of claim 2, wherein the processing circuitry is configured to cause the transmitter to transmit the indication that the user equipment supports the legacy regulation by not setting the field corresponding to one or more network signaling flags to the predetermined value.

5. The user equipment of claim 1, wherein the one or more network signaling flags comprises a first network signaling flag corresponding to the legacy regulation and a second network signaling flag corresponding to the updated regulation.

6. The user equipment of claim 5, wherein the processing circuitry is configured to cause the transmitter to transmit the indication that the user equipment supports the legacy regulation by setting a first field corresponding to the first network signaling flag to a predetermined value.

7. The user equipment of claim 6, wherein the processing circuitry is configured to cause the transmitter to transmit the indication that the user equipment supports the updated regulation by setting a second field corresponding to the second network signaling flag to the predetermined value.

8. One or more tangible, non-transitory, computer-readable media comprising instructions, that when executed by processing circuitry of user equipment, cause the processing circuitry to:
cause a receiver of the user equipment to receive system information from a base station, the system information comprising one or more network signaling flags indicative of a regulation applicable to a frequency range, the regulation associated with a legacy regulation and an updated regulation;
cause a transmitter of the user equipment to transmit an indication that the user equipment supports the legacy regulation based on the user equipment supporting the legacy regulation; and
cause the transmitter to transmit an indication that the user equipment supports the updated regulation based on the user equipment supporting the updated regulation.

9. The one or more tangible, non-transitory, computer-readable media of claim 8, wherein the instructions, when executed by the processing circuitry, cause the processing circuitry to cause the receiver to receive an additional indication of a frequency band associated with the regulation.

10. The one or more tangible, non-transitory, computer-readable media of claim 9, wherein the instructions, when executed by the processing circuitry, cause the processing circuitry to cause the receiver to receive uplink resources on the frequency band from the base station.

11. The one or more tangible, non-transitory, computer-readable media of claim 10, wherein the uplink resources conform to the legacy regulation based on the indication that the user equipment supports the legacy regulation or to the updated regulation based on the user equipment supporting the updated regulation.

12. The one or more tangible, non-transitory, computer-readable media of claim 8, wherein the instructions, when executed by the processing circuitry, cause the processing circuitry to cause the transmitter to transmit the indication that the user equipment supports the updated regulation by setting a field corresponding to one or more network signaling flags to a predetermined value.

13. The one or more tangible, non-transitory, computer-readable media of claim 12, wherein the one or more network signaling flags comprises a first network signaling flag corresponding to the legacy regulation and a second network signaling flag corresponding to the updated regulation.

14. The one or more tangible, non-transitory, computer-readable media of claim 13, wherein the instructions, when executed by the processing circuitry, cause the processing circuitry to cause the transmitter to transmit the indication that the user equipment supports the legacy regulation by setting a first field corresponding to the first network signaling flag to a predetermined value.

15. The one or more tangible, non-transitory, computer-readable media of claim 14, wherein the instructions, when executed by the processing circuitry, cause the processing circuitry to cause the transmitter to transmit the indication that the user equipment supports the updated regulation by setting a second field corresponding to the second network signaling flag to the predetermined value.

16. A method performed by user equipment, comprising:
receiving, via a receiver of the user equipment, system information from a base station, the system information comprising one or more network signaling flags indicative of a regulation applicable to a frequency range, the regulation associated with a legacy regulation and an updated regulation;
transmitting, via a transmitter of the user equipment, an indication that the user equipment supports the legacy regulation based on the user equipment supporting the legacy regulation; and
transmitting, via the transmitter, an indication that the user equipment supports the updated regulation based on the user equipment supporting the updated regulation.

17. The method of claim 16, wherein transmitting the indication comprises configuring, via processing circuitry of the user equipment, a first field corresponding to a first network signaling flag of the one or more network signaling flags based on the user equipment supporting the legacy regulation, and wherein transmitting the indication comprises configuring, via the processing circuitry, a second field corresponding to a second network signaling flag of the one or more network signaling flags based on the user equipment supporting the updated regulation.

18. The method of claim 17, wherein the first field and the second field each comprise modified maximum power reduction behavior bits.

19. The method of claim 17, comprising receiving, via the receiver, uplink resources on the frequency range from the base station, wherein the uplink resources conform to the legacy regulation based on the first field being configured, and wherein the uplink resources conform to the updated regulation based on the second field being configured.

20. The method of claim 16, wherein the frequency range comprises between 2305 megahertz (MHz) and 2320 MHz for uplink resources, and wherein the frequency range comprises between 2345 megahertz (MHz) and 2360 MHz for downlink resources.

* * * * *